Figure 1:
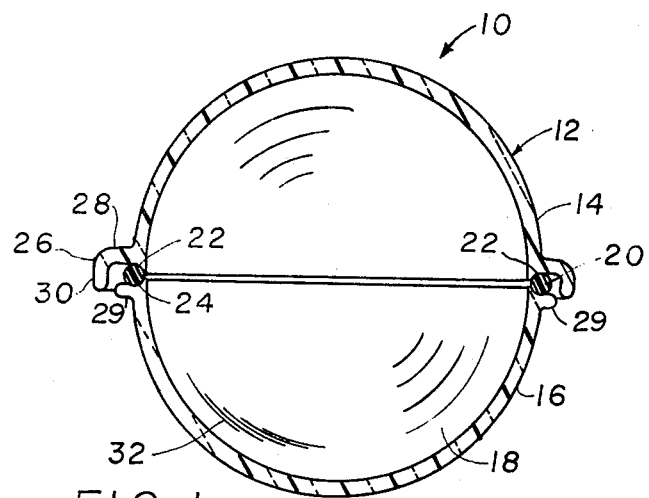

United States Patent [19]

Atkinson, Jr.

[11] 4,357,375

[45] Nov. 2, 1982

[54] VACUUM BALL INSULATION

[76] Inventor: Hugh H. Atkinson, Jr., 41 Front St., Lonaconing, Md. 21539

[21] Appl. No.: 192,185

[22] Filed: Sep. 30, 1980

Related U.S. Application Data

[63] Continuation of Ser. No. 908,006, May 22, 1978, abandoned.

[51] Int. Cl.³ ............................................. A63B 39/08
[52] U.S. Cl. ..................................... 428/11; 428/325; 428/406
[58] Field of Search ..................... 428/11, 325, 406; 29/148.4 B; 273/58 R, 58 B, 58 K

[56] References Cited

U.S. PATENT DOCUMENTS

| | | | |
|---|---|---|---|
| 1,095,829 | 5/1914 | Dunlap | 428/11 X |
| 2,784,512 | 3/1957 | Goodwin | 428/11 X |
| 3,132,695 | 5/1964 | Peltier | 428/11 X |
| 3,192,529 | 6/1965 | Chatelain | 428/11 X |
| 4,303,730 | 12/1981 | Torobin | 428/333 |

FOREIGN PATENT DOCUMENTS 735153  5/1966  Canada ................................. 428/11

*Primary Examiner*—Henry F. Epstein
*Attorney, Agent, or Firm*—John F. McClellan, Sr.

[57] ABSTRACT

High efficiency multi-cellular non-absorbing light weight insulation which has anti-friction flow characteristics for reaching and filling nooks and crannies not fillable by ordinary insulations, and which can be applied by usual methods comprises a plurality of relatively small, evacuated spheres of glass or suitable plastic; means and method for fabrication and evacuation are also disclosed.

1 Claim, 2 Drawing Figures

U.S. Patent    Nov. 2, 1982    4,357,375

VACUUM BALL INSULATION

This is a continuation of application Ser. No. 908,006 filed May 22, 1978 and now abandoned.

This invention relates generally to insulation and particularly to insulation of the vacuum type.

In the prior art it has been known to use double-wall containers evacuated between the walls to keep liquids such as coffee and tea hot or cold as desired, and further it has been known to insulate with multi-cellular blanket or other integral materials with either communicating or non-communicating cellular structure, and also it has been known to use material suitable for purable or blowable installation techniques.

However, although use of vacuum is known as the least conductive insulation means, it is believed that to data no disclosure has been made overcoming the problems in embodying vacuum techniques in pourable, blowable, insulation which is also highly efficient as radiative-transfer insulation, and to provide such is a principal object of this invention.

Other objects are to provide insulation as described which is, in particular mass, slippery and pressure-extrudable to an extent preventing lumping together, but instead permitting the mass to flow readily upward or laterally in one area upon downward pressure in another, for easy and efficient distribution in wall spaces and under floors and the like.

Still other objects are to supply vacuum-type discrete insulative material which can be embodied in flexible batts or in rigid slabs if desired, using ordinary connective materials and methods.

And further objects are to provide insulative material as described which is light-weight, damage resistant, easy to handle and install, long lasting, non-toxic, attractive in appearance, and easily and economically made.

In brief summary given for cursive descriptive purposes only and not as limitation, the invention includes provision of evacuated sphere means and method for comprising elemental units of massive insulation.

Figure 2:
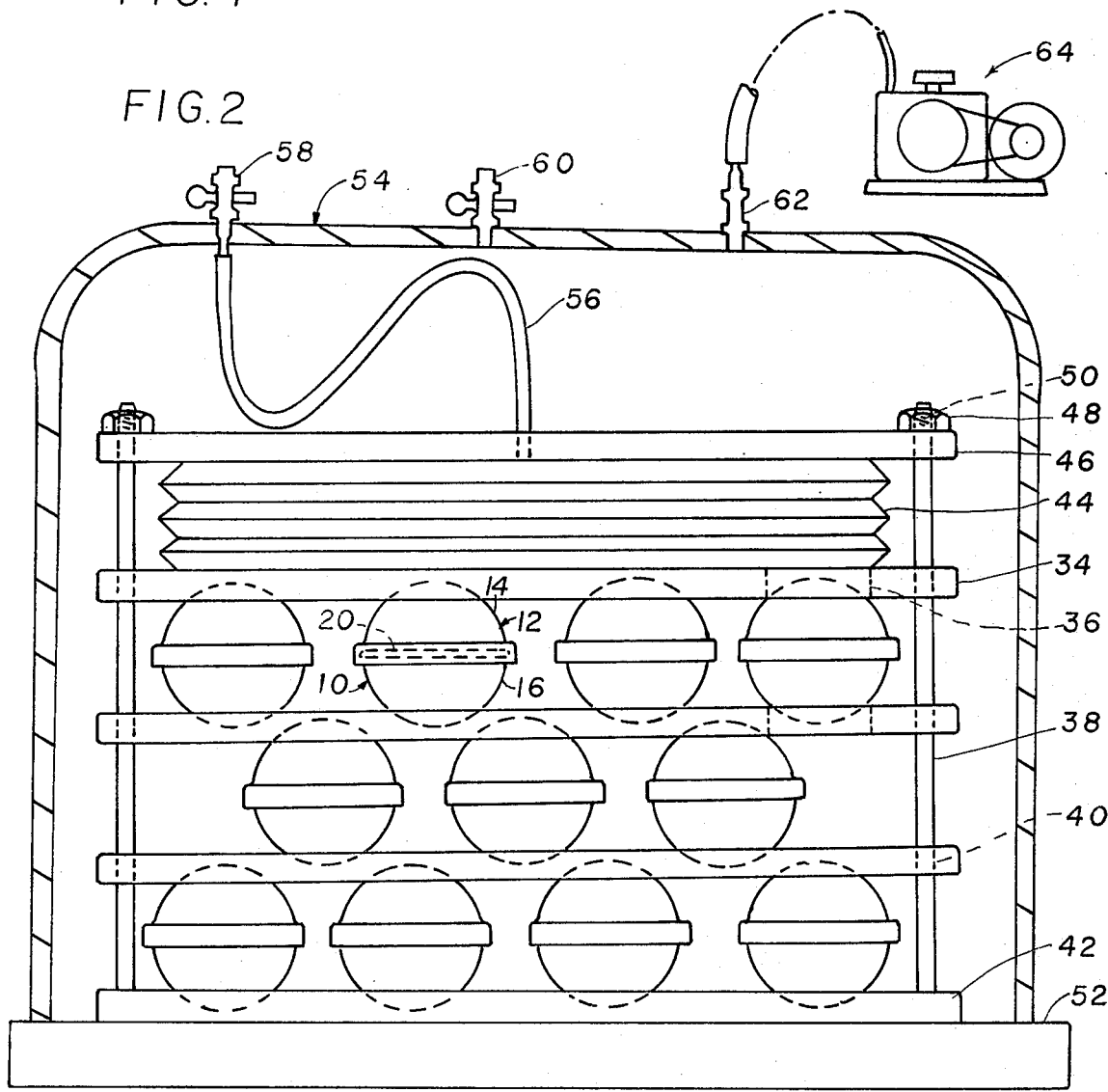

The above and other objects and advantages of the invention will become more readily understood on examination of the following description, including the drawings in which like reference numerals refer to like parts;

FIG. 1 is a side elevational sectional view of an embodiment of the invention; and FIG. 2 is a side elevational diagram in partial section of a system for evacuating the spheres of this invention.

FIG. 1 shows an embodiment 10 of this invention in elemental unit, a glass sphere 12 made of first and second hemispheres 14, 16, the interior 18 evacuated, and the hemispheres joined at the equator by force of ambient air pressure sealing them against an elastomeric or similarly resiliently compressible "O" ring seal 20.

Structure defining a preferably molded peripheral recess 22, 24 in the wall of the respective hemispheres at the equator constrains the "O" ring on the inner side and around the top and bottom. Preferably at least one hemisphere has an annular flange 26 around the equator; the flange is "L" shaped in section so that one leg 28 projects radially outwardly from the hemisphere and from it the other leg 30 integrally projects as an annulus in meridional direction, overhanging and shielding the "O"-ring seal. The other hemisphere, 16, may have a flange 29 generally corresponding to the leg 28 of the first hemisphere flange but without a second leg.

Sectional diameter or thickness of the "O"-ring seal is such that it prevents the hemispheres from touching when forced together under one atmosphere of pressure plus a safety margin, which may total, for example, twenty pounds per square inch.

In the preferred embodiment each sphere is about one inch in diameter. In glass, the wall thickness may be about 1/32 inch. In plastic such as rigid polystyrene the wall thickness may be the same.

In insulation against radiative transfer through them, preferably the spheres are "silvered" as by a flash coating of aluminum 32 which may be on the inside, the outside, or both, and applied by well-known vacuum-coating techniques.

SPHERE-EVACUATION APPARATUS STRUCTURE

FIG. 2 shows the final stage of production according to the preferred mode of the invention. The sphere components 14, 16, 20 are pre-assembled into spherical shape, and contained, in layers of pre-assembled spheres, between superimposed platforms 34 having therein sphere holding perforations 36 in register with each other.

The platforms are slidably mounted on uprights 38 by holes 40 in the uprights. The uprights are held in assembly by a base 42 fixed to the uprights at the bottom. After all sphere assemblies are fitted between platforms in the respective perforations a collapsed bellows 44 is placed on the top platform and above that a top plate 46 mounted in similar manner to the platforms is secured by nuts 48 which engage threads 50 at the tops of the respective uprights.

The entire platform held sphere and bellows assembly is then placed on a base plate 52 and covered by a bell jar 54 or otherwise appropriately arranged for evacuation, with a vacuum lead 56 connecting the bellows with first valve 58 fixed in the bell jar wall.

A second, similar valve 60 in the bell jar wall vents the bell jar interior to atmosphere.

OPERATION OF SPHERE-EVACUATION APPARATUS

With both valves closed the bell jar is evacuated by appropriate conventional connection 62 with a vacuum pump 64.

According to provisions of this invention, as the pressure in the bell jar space reduces, air within each sphere escapes past the "O" ring to the lower pressure of the bell jar, slightly separating the hemispheres as required for the gradual escape, but not enough for unseating the "O" rings, which may normally bias against the seats or grooves.

Final assembly occurs as follows: after bell jar and sphere evacuation, the pump is shut off or isolated and valve 58 is opened to the atmosphere, distending the bellows and mechanically forcing the hemispheres together on the "O" ring seals under greater than atmospheric pressure, since the area of the effective portion of the bellows exposed to the atmosphere is greater than the combined projected areas of the spheres, there being gaps between and around the edges of the circular outlines of the spheres. The overpressure more positively seats and forms the seals, and can permit lower tolerances of fit to be used.

Following this, valve 60 is opened, venting the bell jar, the bell jar is removed, and the spheres are removed, now evacuated, sealed and ready for use as poured or blown insulation, or attached by conventional means and materials in batts or slabs.

As loose, poured or blown insulation, the substantially spherical elements closely nest together so that the interstices between them become effectively dead air pockets, supplementing the vacuum insulation effect.

It is evident that the sphere-assemblies may be loosely held together individually and evacuated in mass without precise alignment or subsequent bellows pre-pressure, also, and that such will fall within the spirit of the invention.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by United States Letters Patent is:

1. In insulation having plural identical separate discrete elements the improvement comprising: each element being substantially spherical and containing therein a vacuum for retarding thermal transfer by conduction therethrough, each element having a reflective aluminum coating for retarding thermal transfer by radiation therethrough, each element including first and second hemispheres, means for sealing between said first and second hemispheres at the equator, the sealing means including an "O" ring seal, each hemisphere having a respective annular flange with a peripheral recess therein at the equator for containing the "O" ring seal, the annular flange on the first hemisphere being "L"-shaped in section and having a first leg thereof which projects radially outward from the hemisphere and a second leg integral with the first leg which overhangs and shields the "O" ring seal; the "O" ring seal resiliently holding apart said hemispheres against the force of ambient air pressure sealing said hemispheres in assembly.

* * * * *